United States Patent
Evans et al.

(10) Patent No.: US 6,630,160 B1
(45) Date of Patent: Oct. 7, 2003

(54) PROCESS TO MODULATE DISEASE RISK WITH DOSES OF A NUTRACEUTICAL

(75) Inventors: Steven Evans, Omaha, NE (US); Jerome Bernard Block, Rancho Palos Verdes, CA (US)

(73) Assignee: Genetic Services Management, Inc., Omaha, NE (US)

( * ) Notice: Subject to any disclaimer, the term of this patent is extended or adjusted under 35 U.S.C. 154(b) by 0 days.

(21) Appl. No.: 09/654,802

(22) Filed: Sep. 5, 2000

Related U.S. Application Data

(60) Provisional application No. 60/152,842, filed on Sep. 7, 1999.

(51) Int. Cl.[7] .................................................. A61K 9/48
(52) U.S. Cl. ....................... 424/451; 424/464; 424/489; 424/702; 424/729; 424/754
(58) Field of Search ............................... 424/464, 451, 424/489, 195.15, 198.17, 725, 729, 754, 757, 702; 514/458

(56) References Cited

U.S. PATENT DOCUMENTS 5,603,937 A * 2/1997 Kondoh et al. .......... 424/195.1
5,744,187 A * 4/1998 Gaynor ........................ 426/599
5,948,443 A * 9/1999 Riley et al. .................. 424/463

OTHER PUBLICATIONS

Clark, L.C. et al., Effects of Selenium Supplementation . . . JAMA, Dec., 1996, pp 1957–1963, 276(24). USA.

Lockwood, K. et al., Partial and Complete regression of breast cancer . . . Biochem Biophys Res Comm, 1994, 199:1504–8.

* cited by examiner

Primary Examiner—Thurman K. Page
Assistant Examiner—Liliana Di Nola-Baron

(57) ABSTRACT

A dietary supplement is created, comprised of material from the following nutrients, vitamins, herbs, minerals, and food and plant substances and food and plant derivatives: lycopene, vitamin E, selenium, green tea, coenzyme Q10, garlic, folic acid, vitamin C, curcumin, seaweed, Cordyceps sinsensis mushroom, Lentinus edodes (shiitake) mushroom, and Ganoderma lucidum (reishi) mushroom. The composition is administered orally for individuals who wish to reduce their risk of disease, particularly cancer-risk.

4 Claims, No Drawings

PROCESS TO MODULATE DISEASE RISK WITH DOSES OF A NUTRACEUTICAL

CROSS-REFERENCE TO RELATED APPLICATIONS

Provisional application Serial No. 60/152,842 filed Sep. 7, 1999.

STATEMENT REGARDING FEDERALLY SPONSORED RESEARCH OR DEVELOPMENT

Not applicable

REFERENCE TO A MICROFICHE APPENDIX

Not applicable

BACKGROUND OF INVENTION

Cancer care is reported to have cost Americans more than $110 billion in 1992, more than 11% of all expenditures spent on diseases in America. Researchers have indicated that from 50–90% of all cancers could be prevented through proper nutrition. There has evolved a new professional descriptive term "nutraceuticals" which combines the term "nutrient" and the term "pharmaceuticals" to describe this genre of medicinal agents that may be comprised of one or more complex combinations of ingredients made from nutrients, vitamins, minerals, herbs, and food and plant derivatives. We shall employ this term "nutraceutical" to refer to such a composition of one or more ingredients.

This invention addresses the need for a dietary supplement that can reduce risk of disease, particularly cancer risk, that will be efficacious for a significant segment of the population. There have been tests and clinical trials on numerous individual agents for their role as cancer preventatives, such as coenzyme Q10 or selenium, but the daunting task of intelligently combining complex compositions has precluded exploration of complex compositions of nutraceuticals for cancer risk reduction. Thus in the past, one single ingredient would be selected and tested for its role as a cancer preventative for some specific cancer, usually in individuals who already had cancer. For example, selenium was tested for cancer prevention in patients who had had carcinoma of the skin [Clark, L. C., Combs; G. F., Jr., Turnbull, B. W., Slate, E. H., Chalker, D. K., Chow, J., Davis, L. S., Glover, R. A., Graham, G. F., Gross, E. G., Krongrad, A., Lesher, J. L., Park, H. K., Sanders, B. B., Jr., Smith, C. L., Taylor, J. R. Effects of selenium supplementation for cancer prevention in patients with carcinoma of the skin. A randomized controlled trial. JAMA. 276 (24): 1957–1963, Dec. 1996]. Similarly the effects of coenzyme Q10 suggested possible efficacious results in limited case studies with individuals with breast cancer [Lockwood, K., Moesgaard, S., Folkers, K. Partial and complete regression of breast cancer in patients in relation to dosage of coenzyme Q10. Biochem Biophys Res Comm. 199: 1504–1508, 1994]. However researchers as noted have been preoccupied with traditional experimental design methodology whereby these investigators wish to determine whether one specific ingredient is effective or not, usually for one specific cancer, and even then, as a treatment rather than a preventative. Another reason single individual ingredients were selected is because researchers have focused on just one of the following biologic, cancer-fighting, etiologically-oriented domains of interest: (1) anti-tumor activity, or (2) immune stimulating activity, or (3) anti-viral activity, or (4) anti-inflammatory activity, or (5) antimutagenic activity, or (6) antiproliferative activity, or (7) anti-free-radical development. This microfocus has precluded the realization that by combining all those ingredients which work for one subset or another of the population, for one type of cancer or another, for one etiological reason or another, a powerful net effect can be achieved, along with the synergy of the ingredients working together.

BRIEF SUMMARY OF THE INVENTION

The present invention provides a complex composition (a "nutraceutical") comprising material from known nutrients, vitamins, herbs, minerals, and food and plant substances and food and plant derivatives which are useful to reduce risk of disease, particularly cancer risk, for one or more of all the known etiological factors that affect cancer development and hence yields cancer prevention for the consumer of this nutraceutical. This nutraceutical profoundly reduces risk of cancers through the multiple actions of all the etiological factors addressing cancer-causing conditions, such as providing (1) anti-tumor activity, and (2) immune stimulating activity, and (3) anti-viral activity, and (4) anti-inflammatory activity, and (5) antimutagenic activity, and (6) antiproliferative activity, and (7) anti-free-radical development. The nutraceutical is comprised of lycopene, vitamin E, selenium, green tea polyphenols, Coenzyme Q-10, garlic, folic acid, vitamin C, curcumin, seaweed, Cordyceps sinsensis mushroom, Lentinus edodes (shiitake) mushroom, and Ganoderma lucidum (reishi) mushroom. Preferably the material from each of such entries is in dried powder form.

The composition is administered orally. The nutraceutical of the invention is preferably provided in an ingestible form, such as, for example, a powder, capsule, or tablet.

The invention provides a nutraceutical composition for reducing risk of disease in individuals who are in need thereof, particularly cancer risk, which includes those who have never had cancer, may have had cancer but who wish to prevent reoccurrences, or for reducing cancer risk in individuals who already have cancer but who wish to prevent metastasis of such cancer(s).

BRIEF DESCRIPTION OF THE SEVERAL VIEWS OF THE DRAWING

Not applicable

DETAILED DESCRIPTION OF THE INVENTION

In this invention, ingredients were specifically chosen and combined according to their individual science, peer-reviewed journal support for a role in disease prevention, particularly cancer prevention, related to one or more of the etiologic domains of interest affecting cancer development. Although each ingredient selected for the preferred embodiment has been used before for possible cancer prevention and cancer risk reduction, their total combination as a holistic approach for cancer prevention is a new concept. The individual ingredients were selected because there is scientific evidence to indicate they each possess one or more of the following biologic etiologic disease-prevention, cancer-prevention activities: (1) anti-tumor activity, (2) immune stimulating activity, (3) anti-viral activity, (4) anti-inflammatory activity, (5) antimutagenic activity, (6) antiproliferative activity, and (7) anti-free-radical development activity.

Since each ingredient may exhibit one or more of the following attributes, we present key scientific data for each ingredient, organized by ingredient.

Coenzyme Q10
1. Ames, B. N., Shigenaga, M. K., Hagen, T. M. Oxidants, antioxidants, and the degenerative diseases of aging. Proc. Natl. Acad. Sci. USA. 90: 7915–7922, Sep. 1993.
2. Lockwood, K., Moesgaard, S., Folkers, K. Partial and complete regression of breast cancer in patients in relation to dosage of coenzyme Q10. Biochem Biophys Res Comm. 199: 1504–1508, 1994.
3. Lockwood, K., Moesgaard, S., Yamamoto, T., Folkers, K. Progress on therapy of breast cancer in vitamin Q10 and regression of metastases, Biochem Biophys Res Comm. 212: 172–177, 1995.
4. Ren, S., Lien, E. J. Natural products and their derivatives as cancer chemopreventive agents. Prog Drug Res. 48: 147–71, 1997.

Cordyceps sinensis
1. Chiu, J. H., Ju; C. H., Wu, L. H., Lui, W. Y., Wu, C. W., Shiao, M. S., Hong, C. Y. Cordyceps sinsensis increases the expression of major histocompatibility complex class II antigens on human hepatoma cell line HA22T/VGH cells. Am J Chin Med. 26 (2): 159–70, 1998.
2. Chen, Y. J., Shiao, M. S., Lee, S. S., Wang, S. Y. Effect of Cordyceps sinensis on the proliferation and differentiation of human leukemic U937 cells. Life Sci. 60 (25): 2349–59, 1997.
3. Kuo, Y. C., Lin, C. Y., Tsai, W. J., Wu, C. L., Chen, C. F., Shiao, M. S. Growth inhibitors against tumor cells in Cordyceps sinensis other than cordycepin and polysaccharides. Cancer Invest. 12 (6): 611–5, 1994.
4. Nakamura, K., Yamaguchi, Y., Kagota, S., Kwon, Y. M., Shinozuka, K., Kunimoto, M. Inhibitory effect of Cordyceps sinensis on spontaneous liver metastasis of Lewis lung carcinoma and B16 melanoma cells in syngeneic mice. Jpn J Pharmacol. 79 (3): 335–41, Mar. 1999.
5. Ohmori, T., Tamura, K., Fukui, K., Kawanishi, G., Mitsuyama, M., Nomoto, K., Miyazaki, T. Isolation of galactosaminoglycan moiety (CO—N) from protein-bound polysaccharide of Cordyceps ophioglossoides and its effects against murine tumors. Chem Pharm Bull (Tokyo). 37 (4): 1019–22, Apr. 1989.
6. Ohmori, T., Tamura, K., Tsuru, S., Nomoto, K. Antitumor activity of protein-bound polysaccharide from Cordyceps ophioglossoides in mice. Jpn J Cancer Res. 77 (12): 1256–63, Dec. 1986.
7. Yamaguchi, N., Yoshida, J., Ren, L. J., Chen, H., Miyazawa, Y., Fujii, Y., Huang, Y. X., Takamura, S., Suzuki, S., Koshimura, S., et al. Augmentation of various immune reactivities of tumor-bearing hosts with an extract of Cordyceps sinensis. Biotherapy. 2 (3): 199–205, 1990.
8. Yoshida, J., Takamura, S., Yamaguchi, N., Ren, L. J., Chen, H., Koshimura, S. Suzuki, S. Antitumor activity of an extract of Cordyceps sinensis (Berk.) Sacc. against murine tumor cell lines. Jpn J Exp Med. 59 (4): 157–61, Aug. 1989.

Curcumin
1. Berwick, M., Schantz, S. Chemoprevention of aerodigestive cancer. Cancer Metastasis Rev. 16 (3–4): 329–47, Sep.–Dec. 1997.
2. Bjeldanes, L. F., Chang, G. W. Mutagenic activity of quercetin and related compounds, Science. 197: 577–8, 1977.
3. Boone, C. W., Kelloff, G. J., Biomarker end-points in cancer chemopreventive trials. IARC Sci Publ. 142: 273–80, 1997.
4. Craig, W. J. Health-promoting properties of common herbs. Am J Clin Nutr. 70 (3 Suppl): 491S–499S, Sep. 1999.
5. Deschner, E. E., Ruperto, J., Wong, G., Newmark, H. L. Quercetin and rutin as inhibitors of azoxymethanol-induced colonic neoplasia. Carcinogenesis. 12 (7): 1193–6, Jul. 1991.
6. Khafif, A., et al. "Quantitation of chemopreventive synergism between (−)-epigallocatechin-3-gallate and curcumin in normal, premalignant and malignant human oral epithelial cells." Carcinogenesis. 19: 419–424, 1998.
7. Rao, C. V., Rivenson, A., Simi, B., Reddy, B. S. Chemoprevention of color carcinogenesis by dietary curcumin, a naturally occurring plant phenolic compound. Cancer Res. 55 (2): 259–66, Jan. 1995.
8. Ren, S., Lien, E. J. Natural products and their derivatives as cancer chemopreventive agents. Prog Drug Res. 48: 147–71, 1997.

Folic Acid
1. Beck, L. H., Kumar, S. P. Update in prevention medicine. Am Coll Phys—Am Soc Int Med. Ann Intern Med 131(9): 681–687, Nov. 1999.
2. Berwick, M., Schantz, S. Chemoprevention of aerodigestive cancer. Cancer Metastasis Rev. 16 (3–4): 329–47, Sep.–Dec. 1997.
3. Giovannucci, E., Stampfer, M. J., Colditz, G. A., Hunter, D. J., Fuchs, C., Rosner, B. A., Speizer, F. E., Willett, W. C. Multivitamin use, folate, and colon cancer in women in the Nurses' Health Study. Ann Intern Med. 129: 517–524, 1998.
4. Rohan, T. E., Jain, M. G., Howe, G. R., Miller, A. B. Dietary folate consumption and breast cancer risk. J Natl Cancer Inst. 92 (3): 266–269, Feb. 2000.
5. Zhang, S., Hunter, D. J., Hankinson, S. E., Giovannucci, E. L., Rosner, B. A., Colditz, G. A., Speizer, F. E., Willett, W. C. A prospective study of folate intake and the risk of breast cancer. JAMA. 281 (17): 1632–1637, May 1999.

Garlic
1. Craig, W. J. Health-promoting properties of common herbs. Am J Clin Nutr. 70 (3 Suppl): 491S–499S, Sep. 1999.
2. Frohlich, R. H., Kunze, M., Kiefer, I. Cancer preventive value of natural, non-nutritive food constituents. Acta Med Austriaca. 24 (3): 108–13, 1997.
3. Gao, C. M., Takezaki, T., Ding, J. H., Li, M. S., Tajima, K. Protective effect of allium vegetables against both esophageal and stomach cancer: a simultaneous case-referent study of a high-epidemic area in Jiangsu Province, China. Jpn J Cancer Res. 90 (6): 614–21, 1999.
4. Sivam, G. P., Lampe, J. W., Ulness, B., Swanzy, S. R., Potter, J. D. Helicobacter pylori—in vitro susceptibility to garlic (Allium sativum) extract. Nutr Cancer. 27 (2): 118–21, 1997.
5. Sun, A., Ostadal, O., Ryznar, V., Dulik, I., Dusek, J., Vaclavik, A., Yeh, H-C., Hsu, C., Bruckner, H. W., Fasy, T. M. Phase I/II Study of Stage III and IV Non-Small Cell Lung Cancer Patients Taking a Specific Dietary Supplement. Nutrition.and Cancer. 34(1): 62–69, 1999.
6. Takezaki, T., Gao, C. M., Ding, J. H., Liu, T. K., Li, M. S., Tajima, K/ Comparative study of lifestyles of residents in high and low risk areas for gastric cancer in Jiangsu Province, China; with special reference to allium vegetables. J Epidemiol. 9 (5): 297–305, Nov. 1999.

Green Tea
1. Ahmad, N., Feyes, D. K., Nieminen, A. L., Agarwal, R., Mukhtar, H. Green tea constituent epigallocatechin-3-gallate and induction of apoptosis and cell cycle arrest in human carcinoma cells. J Natl Cancer Inst. 89: 1881–6, 1997.
2. Berwick, M., Schantz, S. Chemoprevention of aerodigestive cancer. Cancer Metastasis Rev. 16 (3–4): 329–47, Sep.–Dec. 1997.

3. Bjeldanes, L. F., Chang, G. W. Mutagenic activity of quercetin and related compounds, Science. 197: 577–8, 1977.
4. Chung, F. L The prevention of lung cancer induced by a tobacco-specific carcinogen in rodents by green and black tea. Proc Soc Exp Biol Med. 220 (4): 244–8, Apr. 1999.
4. Craig, W. J. Health-promoting properties of common herbs. Am J Clin Nutr. 70 (3 Suppl): 491S–499S, Sep. 1999.
5. Fujiki, H., Suganuma, M., Okabe, S., Sueoka, N., Komori, A., Sueoka, E., Kozu, T., Tada, Y., Suga, K., Imai, K., Nakachi, K. Cancer Inhibition by green tea. Mutation Research. 402: 307–310, 1998.
6. Gupta, S., Ahmad, N., Mohan, R. R., Husain, M. M., Mujhtar, H. Prostate cancer chemoprevention by green tea: in vitro and in vivo inhibition of testosterone-mediated induction of ornithine decarboxylase. Cancer Res. 59 (9): 2115–20, May 1999.
8. Gupta, S., Ahmad, N., Mukhtar, H. Prostate cancer chemoprevention by green tea. Semin. Urol. Oncol. 17 (2): 70–6, May 1999.
9. Khafif, A., et al. "Quantitation of chemopreventive synergism between (–)-epigallocatechin-3-gallate and curcumin in normal, premalignant and malignant human oral epithelial cells." Carcinogenesis. 19: 419–424, 1998.
10. Kohlmeier, L., Weterings, K. G. C., Steck, S., Kok, F. J. Tea and cancer prevention: an evaluation of the epidemiologic literature. Nutr Cancer. 27 (1): 1–13, 1997.
11. Ren, S., Lien, E. J. Natural products and their derivatives as cancer chemopreventive agents. Prog Drug Res. 48: 147–71, 1997.
12. Yun, T. K. Update from Asia. Asian studies on cancer prevention. Ann N Y Acad Sci. 889: 157–92, 1999.

Lycopene
1. Amir, H., Karas, M., Giat, J., Danilenko, M., Levy, R., Yermiahu, T., Levy, J., Sharoni, Y. Lycopene and 125-Dihydroxyvitamin D3 cooperate in the inhibition of cell cycle progression and induction of differentiation in HL-60 leukemic cells. Nutr Cancer. 33 (1): 105–112, 1999.
2. Black, H. S. Radical interception by carotenoids and effects on UV carcinogenesis. Nutr Cancer. 31 (3): 212–7, 1998.
3. Clinton, S. K., Emenhiser, C., Schwartz, S. J., et al. Cis-trans lycopene isomers, carotenoids, and retinol in human prostate. Cancer Epidemiol Biomarkers Prev. 5: 823–33, 1996.
4. Cohen, L. A., Zhao, Z., Pittman, B., Khachik, F. Effect of dietary lycopene on N-Methylnitrosourea-induced mammary tumorigenesis. Nutrition and Cancer. 34(2): 153–159, 1999.
5. Di Mascio, P., Kaiser, S., Sies, H. Lycopene as the most efficient biological carotenoid singlet oxygen quencher. Arch Biochem Biophys. 274 (2): 532–538, 1989.
6. Freeman, V. L., Meydani, M., Yong,. S., et al. Prostatic levels of tocopherols, carotenoids, and retinol in relation to plasma levels and elf-reported usual dietary intake. Am. J. Epidemiol. 151: 109–18, 2000.
7. Gann, P. H., Ma, J., Giovannucci, E., Willett, W., Sacks, F. M., Hennekens, C. H., Stampfer, M. J. Lower prostate cancer risk in men with elevated plasma lycopene levels: results of a prospective analysis. Cancer Res. 59 (6): 1225–30, 1999.
8. Giovannucci, E., Ascheno, A., Rimm, E. B., et al. Intake of carotenoids and retinol in relation to risk of prostate cancer. J. Natl Cancer Inst. 87: 1767–76, 1995.
9. Jain, M. G., Hislop, G. T., Howe, G. R., Ghadirian, P. Plant foods, antioxidants, and prostate cancer risk: findings from case-control studies in Canada. Nutr Cancer. 34 (2): 173–184, 1999.
10. Kim, D. J., Takasuka, N., Kim, J. M., Sekine, K., Ota, T., Asanioto, M., Murakoshi, M., Nishino, N., Nir, Z., Tsuda, H. Chemoprevention by lycopene of mouse lung neoplasia after combined initiation treatment with DEN, MNU, and DMH. Cancer Lett. 120 (1): 15–22, Nov. 1997.
11. Kristal, A. R., Cohen, J. H. Invited commentary: Tomatoes, lycopene, and prostate cancer. How strong is the evidence? Am. J. Epidemiol. 151: 124–127, 2000.
12. Kucuk, O., Sakr, W., Sarkar, F. H., Djuric, Z., Li, Y-W., Velazquez, F., Banerjee, M., Bertram, J. S., Crissman, J. D., and Wood, D. P. Jr. Lycopene supplementation in men with localized prostate cancer (PCa) modulates grade and volume of prostatic intraepithelial neoplasia (PIN) and tumor, level of serum PSA and biomarkers of cell growth, differentiation and apoptosis. Proc Amer Assoc Cancer Res. 40: 409, 1999.
13. Kumar, N. B., Besterman-Dahan, K. Nutrients in the chemoprevention of prostate cancer: current and future prospects. Cancer Control. 6(6): 580–586, Nov.–Dec. 1999.
13. Palan, P. R., Mikhail, M. S., Goldberg, G. L., Basu, J., Runowicz, C. D., Romney, S. Plasma levels of beta-carotene, lycopene, canthaxanthin, retinol alpha-and-tau-tocopherol in cervical intraepithelial neoplasia a cancer. Clin Cancer Res. 2 (1): 181–5, 1996.
14. Rao, A. V., Agarwal, S. Bioavailability and in vivo antioxidant properties of lycopene from tomato products and their possible role in the prevention of cancer. Nutr Cancer. 31 (3): 199–203, 1998.
15. Rao, A. V., Fleshner, N., Agarwal, S. Serum and tissue lycopene and biomarkers of oxidation in prostate cancer patients: a case-control study. Nutr Cancer. 33 (2): 159–164, 1999.
16. Sharoni, Y., Giron, E., Rise, M., Levy, J. Effects of lycopene-enriched tomato oleoresin on 7,12-dimethylbenz [a] anthracene-induced rat mammary tumors. Cancer Detect Prev. 21 (2): 118–123, 1997.
17. Slattery, M. L., Potter, J. D., Coates, A., Ma, K-N., Berry, T. D., Duncan, D. M., Caan, B. J. Plant foods and colon cancer: an assessment of specific foods and their related nutrients (United States). Cancer Causes Control. 8: 575–590, 1997.
19. Takezaki, T., Gao, C. M., Ding, J. H., Liu, T. K., Li, M. S., Tajimra, K/ Comparative study of lifestyles of residents in high and low risk areas for gastric cancer in Jiangsu Province, China; with special reference to allium vegetables. J Epidemiol. 9 (5): 297–305, Nov. 1999.
20. Thomas, J. A. Diet, micronutrients, and the prostate gland. Nutr Rev. 57 (4): 95–103, Apr. 1999.
21. Tsubono, Y., Tsugane, S., Gey, K. F. Plasma antioxidant vitamins and carotenoids in five Japanese populations with varied mortality from gastric cancer. Nutr Cancer. 34 (1): 56–61, 1999.
22. Weisburger, J. H. Evaluation of the evidence on the role of tomato products in disease prevention. Proc Soc Exp Biol Med. 218 (2): 140–3, 1998.
23. Ziegler, R. G., Colavito, E. A., Hartge, P., McAdams, M. J., Schoenberg, J. B., Mason, T. J., Fraumeni, J. F., Jr. Importance of α-carotene, β-carotene, and other phytochemicals in the etiology of lung cancer. J Natl Cancer Inst. 88 (9): 612–615, May 1996.

Ganoderma lucidum (reishi)
1. Kim, H. S., Kacew, S., Lee, B. M. In vitro chemopreventive effects of plant polysaccharides (Aloe barbadensis miller, Lentinus edodes, Ganoderma lucidum and (Coriolus versicolor). Carcinogenesis. 20 (8): 1637–40, Aug. 1999.

2. Lieu, C. W., Lee, S. S., Wang, S. Y. The effect of Ganoderma lucidum on induction of differentiation in leukemic U937 cells. Anticancer Res. 12 (4): 1211–5, Jul.–Aug. 1992.
3. Wang, S. Y., Hsu, M. L., Hsu, H. C., Tzeng, C. H., Lee, S. S., Shiao, M. S., Ho, C. K. The anti-tumor effect of Ganoderma lucidum is mediated by cytokines released from activated macrophages and T lymphocytes. Int J Cancer. 70 (6): 699–705, Mar. 1997.
4. Yun, T. K. Update from Asia. Asian studies on cancer prevention. Ann N Y Acad Sci. 889: 157–92, 1999.

Seaweed

1. Colin Slaughter, J. The naturally occurring furanones: formation and function from pheromone to food. Biological Reviews of the Cambridge Philosophical Society. 74 (3): 259–76, Aug. 1999.
2. Hiqashi-Okaj, K., Otani, S., Okai, Y. Potent suppressive effect of a Japanese edible seaweed, Enteromorpha prolifera (Sujiao-nori) on initiation and promotion phases of chemically induced mouse skin tumorigenesis. Cancer Letters. 140 (1–2): 21–5, Jun. 1999.
3. Ichihara, T., Wanibuchi, H., Taniyama, T., Okai, Y., Yano, Y., Otani, S., Imaoka, S., Funae, Y., Fukushima, S. Inhibition of liver glutathione S-transferase placental form-positive foci development in the rat hepatocarcinogenesis by Porphyra tenera (Asakusanori). Cancer Lett. 141 (1–2): 211–8, Jul. 1999.
4. Itoh, H., Noda, H., Amano, H., Ito, H. Immunological analysis of inhibition of lung metastases by fucoidan (GIV-A) prepared from brown seaweed, Sargassum thunbergii. Anticancer Res. 15 (5B): 1937–47, Sep.–Oct. 1995.
5. Sperry, T. S., Thomas, P. Identification of two nuclear androgen receptors in kelp bass (Paralabrax clathratus) and their binding affinities for xenobiotics: comparison with Atlantic croaker (Micropogonias undulatus) androgen receptors. Biol Reprod. 61 (4): 1152–61, Oct. 1999.
6. Maruyama, H., Watanabe, K., Yamamoto, I. Effect of dietary kelp (Laminaria religiosa) on lipid perodixation and glutathione perodixase activity in livers of rats given breast carcinogen DMBA. Nutr Cancer. 15 (3–4): 221–8, 1991.
7. Yamamoto, I., Maruyama, H. Effect of dietary seaweed (Eisenia bicyclis, Laminaria angustata, L. Angustata var. Longissima and Porphyra tenera) preparations on 1,2-dimethylhydrazine-induced intestinal carcinogenesis in rats. Cancer Lett. 26 (3): 241–51, Apr. 1985.
8. Teas, J. The dietary intake of Laminaria, a brown seaweed, and breast cancer prevention. Nutr Cancer. 4 (3): 217–22, 1983.

Selenium

1. Baum, M. K., Shor-Posner, G., Lai, S., Zhang, G., Lai, H., Fletcher, M. A., Sauberlich, H., Page, J. B. High risk of HIV-related mortality is associated with selenium deficiency. J Acquir Immune Def Syn Hum Retrovir. 15: 370–374, 1997.
2. Blot, W. J., Li, J. Y., Taylor, P. R., Guo, W., Dawsey, S., Wang, G-Q., Yang, C. S., Zheng, S-F., Gail, M., Li, G-Y., Y, Y., Liu, B., Tangrea, J., Sun, Y., Fraumeni, J. F., Jr., Zhang, Y-H., Li, B. Nutrition intervention trials in Linxian, China: supplementation with specific vitamin/mineral combinations, cancer incidence, and disease-specific mortality in the general population. J Natl Cancer Inst. 85 (18): 1483–1492, 1993.
3. Clark, L. C., Combs, G. F., Jr., Turnbull, B. W., Slate, E. H., Chalker, D. K., Chow, J., Davis, L. S., Glover, R. A., Graham, G. F., Gross, E. G., Krongrad, A., Lesher, J. L., Park, H. K., Sanders, B. B., Jr., Smith, C. L., Taylor, J. R. Effects of selenium supplementation for cancer prevention in patients with carcinoma of the skin. A randomized controlled trial. JAMA. 276 (24): 1957–1963, Dec. 1996.
4. Gey, K. F. Vitamins E plus C and interacting conutrients required for optimal health. A critical and constructive review of epidemiology and supplementation data regarding cardiovascular disease and cancer. Biofactors. 7 (1–2): 113–74, 1998.
5. Giovannucci, E. Selenium and risk of prostate cancer. Lancet. 352: 755–756, 1998.
6. Kneller, R. W., Guo, W-D., Hsing, A. W., Chen, J-S., Blot, W. J., Li, J-Y., Forman, D., Fraumeni, J. F., Jr. Risk factors for stomach cancer in sixty-five Chinese counties. Cancer Epidemiol Biomarkers Prev. 1:113–118, Jan.–Feb. 1992.
7. Kumar, N. B., Besterman-Dahan, K. Nutrients in the chemoprevention of prostate cancer: current and future prospects. Cancer Control. 6(6): 580–586, Nov.–Dec. 1999.
8. Patterson, R. E., White, E., Kristal A. R., Neuhouser, M. L., Potter, J. D. Vitamin supplements and cancer risk: the epidemiologic evidence. Cancer Causes Control. 8 (5): 786–802, Sep. 1997.
9. Thomas, J. A. Diet, micronutrients, and the prostate gland. Nutr Rev. 57 (4): 95–103, Apr. 1999.
10. Young, K. J., Lee, P. N. Intervention studies on cancer. Eur J Cancer Prev. 8 (2): 91–102, Apr. 1999.

Shiitake (Lentinus edodes)

11. Chang, R. Functional properties of edible mushrooms. Nutr Rev. 54 (11 Pt 2): S91-3, Nov. 1996. [Pleurotus (oyster), Auricularia (mu-er), Flammulina (enokitake), Tremella (yin-er), Hericium, Grifola (maitake) mushrooms]
12. Chihara, G., Hamuro, J., Maeda, Y. Y., Shiio, T., Suga, T., Takasuka N., Sasaki, T. Cancer Detect Prev Suppl. 1: 423–43, 1987.
13. Craig, W. J. Health-promoting properties of common herbs. Am J Clin Nutr. 70 (3 Suppl): 491S–499S, Sep. 1999.
14. Gordon, M., Bihari, B., Goosby, E., Gorter, R., Greco, M., Guralnik, M., Mimura, T., Rudinicki, V., Wong, R., Kaneko, Y. A placebo-controlled trial of the immune modulator, lentinan, in HIV-positive patients: a phase I/II trial. J Med. 29 (5–6): 305–30, 1998.
15. Hamuro, J., Takatsuki, F., Suga, T., Kikuchi, T., Suzuki, M. Synergistic antimetastatic effects of lentinan and interleukin 2 with pre- and post-operative treatments. Jpn J Cancer Res. 85 (12): 1288–97, Dec. 1994.
16. Kim, H. S., Kacew, S., Lee, B. M. In vitro chemopreventive effects of plant polysaccharides (Aloe barbadensis miller, Lentinus edodes, Ganoderma lucidum and (Coriolus versicolor). Carcinogenesis. 20 (8): 1637–40, Aug. 1999.
17. Sun, A., Ostadal, O., Ryznar, V., Dulik, I., Dusek, J., Vaclavik, A., Yeh, H-C., Hsu, C., Bruckner, H. W., Fasy, T. M. Phase I/II Study of Stage III and IV Non-Small Cell Lung Cancer Patients Taking a Specific Dietary Supplement. Nutrition and Cancer. 34(1): 62–69, 1999.

Vitamin C

1. Ames, B. N., Shigenaga, M. K., Hagen, T. M. Oxidants, antioxidants, and the degenerative diseases of aging. Proc. Natl. Acad. Sci. USA. 90: 7915–7922, Sep. 1993.
2. Byers, T., Guerrero, N. Epidemiologic evidence for vitamin C and vitamin E in cancer prevention. Am J Clin Nutr. 62 (Suppl): 1385S–92S, 1995.
3. Carr, A. C., Frei, B. Toward a new recommended dietary allowance for vitamin C based on antioxidant and health effects in humans. Am J Clin Nutr. 69: 1086–107, 1999.

4. Gey, K. F. Vitamins E plus C and interacting conutrients required for optimal health. A critical and constructive review of epidemiology and supplementation data regarding cardiovascular disease and cancer. Biofactors. 7 (1–2): 113–74, 1998.
5. Gey, K. F., Moser, U. K., Jordan, P., Stahelin, H. B., Eichholzer, M., Ludin, E. Increased risk of cardiovascular disease at suboptimal plasma concentrations of essential antioxidants: an epidemiological update with special attention to carotene and vitamin C. Am J Clin Nutr. 57 (suppl): 787S–97S, 1993.
6. Giovannucci, E., Stampfer, M. J., Colditz, G. A., Hunter, D. J., Fuchs, C., Rosner, B. A., Speizer, F. E., Willett, W. C. Multivitamin use, folate, and colon cancer in women in the Nurses' Health Study. Ann Intern Med. 129: 517–524, 1998.
7. Knekt, P. Vitamin E and cancer: epidemiology. Ann NY Acad Sci. 30: 269–279, 1992.
8. Kneller, R. W., Guo, W-D., Hsing, A. W., Chen, J-S., Blot, W. J., Li, J-Y., Forman, D., Fraumeni, J. F., Jr. Risk factors for stomach cancer in sixty-five Chinese counties. Cancer Epidemiol Biomarkers Prev. 1: 113–118, Jan.–Feb. 1992.
9. Kristal, A. R., Stanford, J. L., Cohen, J. H., Wicklund, K., Patterson, R. E. Vitamin and mineral supplement use is associated with reduced risk of prostate cancer. Cancer Epidemiol Biomarkers Prev. 8 (10): 887–92, Oct. 1999.
10. Ocke, M. C., Kromhout, D., Menotti, A., Aravanis, C., Blackburn, H., Buzina, R., Fidanza, F., Jansen, A., Nedeljkovic, S., Nissinen, A., Pekkarinen, M., Toshima, H. Average intake of anti-oxidant (pro)vitamins and subsequent cancer mortality in the 16 cohorts of the seven countries study. Int. J. Cancer. 61: 480–484, 1995.
11. Patterson, R. E., White, E., Kristal A. R., Neuhouser, M. L., Potter, J. D. Vitamin supplements and cancer risk: the epidemiologic evidence. Cancer Causes Control. 8(5): 786–802, Sep. 1997.
12. Prasad, K. N., Kumar, A., Kochupillai, V., Cole, W. C. High doses of multiple antioxidant vitamins: essential ingredients in improving the efficacy of standard cancer therapy. J Am College Nutr. 18 (1): 13–25, 1999.
13. Shibata, A., Paganini-Hill, R. K. R., Henderson, B. E. Intake of vegetables, fruits, beta-carotene, vitamin C and vitamin supplements and cancer incidence among the elderly: a prospective study. Br J Cancer. 66: 673–679, 1992.
14. Slattery, M. L., Potter, J. D., Coates, A., Ma, K-N., Berry, T. D., Duncan, D. M., Caan, B. J. Plant foods and colon cancer: an assessment of specific foods and their related nutrients (United States). Cancer Causes Control. 8: 575–590, 1997.
15. Stahelin, H. B., Gey, K. F., Eichholzer, M., Ludin, E., Bernasconi, F., Thurneysen, J., Brubacher, G. Plasma antioxidant vitamins and subsequent cancer mortality in the 12-year follow-up of the prospective Basel study. Am J Epidemiol. 133: 766–75, 1991.
16. Zhang, S., Hunter, D. J., Forman, M. R., Rosner, B. A., Speizer, F. E., Colditz, G. A., Manson, J. E., Hankinson, S. E., Willett, W. C. Dietary carotenoids and Vitamins A, C, and E and risk of breast cancer. J Natl Cancer Inst. 91:547–56, 1999.
17. Zheng, W., Sellers, T. A., Doyle, T. J., Kushi, L. H., Potter, J. D., Folsom, A. R. Retinol, antioxidant vitamins, and cancers of the upper digestive tract in a prospective cohort study of postmenopausal women. Am J Epidemiol. 142 (9): 955–60, 1995.

Vitamin E

1. Ames, B. N., Shigenaga, M. K., Hagen, T. M. Oxidants, antioxidants, and the degenerative diseases of aging. Proc. Natl. Acad. Sci. USA. 90: 7915–7922, Sep. 1993.
2. Berwick, M., Schantz, S. Chemoprevention of aerodigestive cancer. Cancer Metastasis Rev. 16 (3–4): 329–47, Sep.–Dec. 1997.
3. Blot, W. J., Li, J. Y., Taylor, P. R., Guo, W., Dawsey, S., Wang, G-Q., Yang, C. S., Zheng, S-F., Gail, M., Li, G-Y., Y, Y., Liu, B., Tangrea, J., Sun, Y., Fraumeni, J. F., Jr., Zhang, Y-H., Li, B. Nutrition intervention trials in Linxian, China: supplementation with specific vitamin/mineral combinations, cancer incidence, and disease-specific mortality in the general population. J Natl Cancer Inst. 85 (18): 1483–1492, 1993.
4. Boone, C. W., Kelloff, G. J., Biomarker end-points in cancer chemopreventive trials. IARC Sci Publ. 142: 273–80, 1997.
5. Byers, T., Guerrero, N. Epidemiologic evidence for vitamin C and vitamin E in cancer prevention. Am J Clin Nutr. 62 (Suppl): 1385S–92S, 1995.
6. Gey, K F. Cardiovascular disease and vitamins. Concurrent correction of 'suboptimal' plasma antioxidant levels may, as important part of 'optimal' nutrition, help to prevent early stages of cardiovascular disease and cancer, respectively. Bibl Nutr Dieta. 52: 75–91, 1995.
7. Gey, K. F. Vitamins E plus C and interacting conutrients required for optimal health. A critical and constructive review of epidemiology and supplementation data regarding cardiovascular disease and cancer. Biofactors. 7 (1–2): 113–74, 1998.
8. Gey, K. F., Moser, U. K., Jordan, P., Stahelin, H. B., Eichholzer, M., Ludin, E. Increased risk of cardiovascular disease at suboptimal plasma concentrations of essential antioxidants: an epidemiological update with special attention to carotene and vitamin C. Am J Clin Nutr. 57 (suppl): 787S–97S, 1993.
9. Giovannucci, E., Stampfer, M. J., Colditz, G. A., Hunter, D. J., Fuchs, C., Rosner, B. A., Speizer, F. E., Willett, W. C. Multivitamin use, folate, and colon cancer in women in the Nurses' Health Study. Ann Intern Med. 129: 517–524, 1998.
10. Knekt, P. Vitamin E and cancer: epidemiology. Ann NY Acad Sci. 30: 269–279, 1992.
11. Kristal, A. R., Stanford, J. L., Cohen, J. H., Wicklund, K., Patterson, R. E. Vitamin and mineral supplement use is associated with reduced risk of prostate cancer. Cancer Epidemiol Biomarkers Prev. 8 (10): 887–92, Oct. 1999.
12. Kumar, N. B., Besterman-Dahan, K. Nutrients in the chemoprevention of prostate cancer: current and future prospects. Cancer Control. 6(6): 580–586, Nov.–Dec. 1999.
13. Patterson, R. E., White, E., Kristal A. R., Neuhouser, M. L., Potter, J. D. Vitamin supplements and cancer risk: the epidemiologic evidence. Cancer Causes Control. 8 (5): 786–802, Sep. 1997.
14. Prasad, K. N., Kumar, A., Kochupillai, V., Cole, W. C. High doses of multiple antioxidant vitamins: essential ingredients in improving the efficacy of standard cancer therapy. J Am College Nutr. 18 (1): 13–25, 1999.
15. Shibata, A., Paganini-Hill, R. K. R., Henderson, B. E. Intake of vegetables, fruits, beta carotene, vitamin C and vitamin supplements and cancer incidence among the elderly: a prospective study. Br J Cancer. 66: 673–679, 1992.
16. Slattery, M. L., Potter, J. D., Coates, A., Ma, K-N., Berry, T. D., Duncan, D. M., Caan, B. J. Plant foods and colon cancer: an assessment of specific foods and their related nutrients (United States). Cancer Causes Control. 8: 575–590, 1997.
17. Stahelin, H. B., Gey, K. F., Eichholzer, M., Ludin, E., Bernasconi, F., Thurneysen, J., Brubacher, G. Plasma antioxidant vitamins and subsequent cancer mortality in the 12-year follow-up of the prospective Basel study. Am J Epidemiol. 133: 766–75, 1991.
18. Thomas, J. A. Diet, micronutrients, and the prostate gland. Nutr Rev. 57 (4): 95–103, Apr. 1999.
19. Woodson, K., Tangrea, J. A., Barrett, M. J., Virtamo, J., Taylor, P. R., Albanes, D. Serum α-Tocopherol and subsequent risk of lung cancer among male smokers. J Natl Cancer Inst. 91(20): 1738–1743, Oct. 1999.
20. Zhang, S., Hunter, D. J., Forman, M. R., Rosner, B. A., Speizer, F. E., Colditz, G. A., Manson, J. E., Hankinson, S. E., Willett, W. C. Dietary carotenoids and Vitamins A, C, and E and risk of breast cancer. J Natl Cancer Inst. 91:547–56, 1999.
21. Zheng, W., Sellers, T. A., Doyle, T. J., Kushi, L. H., Potter, J. D., Folsom, A. R. Retinol, antioxidant vitamins, and cancers of the upper digestive tract in a prospective cohort study of postmenopausal women. Am J Epidemiol. 142 (9): 955–60, 1995.
22. Young, K. J., Lee, P. N. Intervention studies on cancer. Eur J Cancer Prev. 8 (2): 91–102, Apr. 1999.

The dosages of the individual ingredients are relative to the level of cancer risk identified in the process, and the range of quantities is approximated below: lycopene—2–20 mg; vitamin E—50–800 IU; selenium—25–400 mcg; green tea—75–600 mg of green tea polyphenols; coenzyme-Q10—3.75–60 mg; garlic 50–700 mg; folic acid—50–800 mcg; vitamin C—60–1000 mg; curcumin—25–400 mg; soy isoflavones—2.5–44 mg; seaweed—25–400 mg.; Cordyceps sinsensis 50–800 mg; Lentinus edodes (shiitake) 50–800 mg; and Ganoderma lucidum (reishi) 50–800 mg.

EXAMPLE 1
Preparation of the Nutraceutical

A preferred formulation of the nutraceutical of the invention is prepared using lycopene, vitamin E, selenium, green tea polyphenols, Coenzyme Q-10, garlic, folic acid, vitamin C, curcumin, soy isoflavones, seaweed, Cordyceps sinsensis mushroom, Lentinus edodes (shiitake) mushroom, and Ganoderma lucidum (reishi) mushroom. In one implementation, the ingredients were purchased by Ives Formulation, Inc. in powdered form based on the preferred embodiment of the dietary supplement formulation, each individual ingredient obtained from various suppliers to that pharmaceutical firm, and were combined into a powder mix and then placed in capsules for ingestion.

What we claim as our invention is:

1. A dietary supplement composition of 13 ingredients which are: lycopene, vitamin E, selenium, green tea polyphenols, coenzyme Q10, garlic, folic acid, vitamin C, curcumin, seaweed, Cordyceps sinsensis mushroom, Lentinus edodes mushroom, and Ganoderma lucidutm mushroom containing the following amounts: lycopene—2 to 20 mg; vitamin E—50 to 800 IU; selenium—25 to 400 mcg; green tea—75 to 600 mg of green tea polyphenols; coenzyme-Q10—3.75 to 60 mg; garlic 50 to 700 mg;, folic acid—50 to 800 mcg; vitamin: C—60 to 1000 mg; curcumin—25 to 400 mg; seaweed—25 to 400 mg.; Cordyceps sinsensis 50 to 800 mg; Lentinus edodes 50 to 800 mg; and Ganoderma lucidum 50 to 800 mg.

2. The composition of claim 1 in dried powder form.
3. The composition of claim 1 in an ingestible form.
4. The composition of claim 3 wherein the ingestible form is selected from a powder, capsule and tablet.

* * * * *